United States Patent

[11] 3,588,077

| [72] | Inventor | Nobuo Ozaki |
| | | 277, Naka 3-cho, Hamadera-Suwanomori-cho, Sakai, Osaka Prefecture, Japan |
| [21] | Appl. No. | 800,152 |
| [22] | Filed | Feb. 18, 1969 |
| [45] | Patented | June 28, 1971 |
| [32] | Priority | Jan. 14, 1969 |
| [33] | | Japan |
| [31] | | 44/3517 |

[54] SAFETY SPRING FOR THE SPEED CHANGE GEAR OF A BICYCLE
8 Claims, 5 Drawing Figs.

[52] U.S. Cl. .................................... 267/176, 263/74
[51] Int. Cl. .................................... F16s 1/46
[50] Field of Search ............................ 267/136, 139, 180, 74

[56] References Cited
UNITED STATES PATENTS
2,846,212   8/1958   Morneau ...................... 263/36
FOREIGN PATENTS
867,332   10/1941   France ...................... 267/1(76)

*Primary Examiner*—James B. Marbert
*Attorney*—Beveridge & DeGrande

ABSTRACT: A safety spring for the speed change gear of a bicycle comprising a coil spring adapted to be disposed axially about a gearshift wire, and a socket member or socket members formed at one or both ends of the coil spring. The socket member or socket members are adapted to hold therein an end or ends of one or two sheaths disposed likewise about the gearshift wire.

PATENTED JUN28 1971 3,588,077
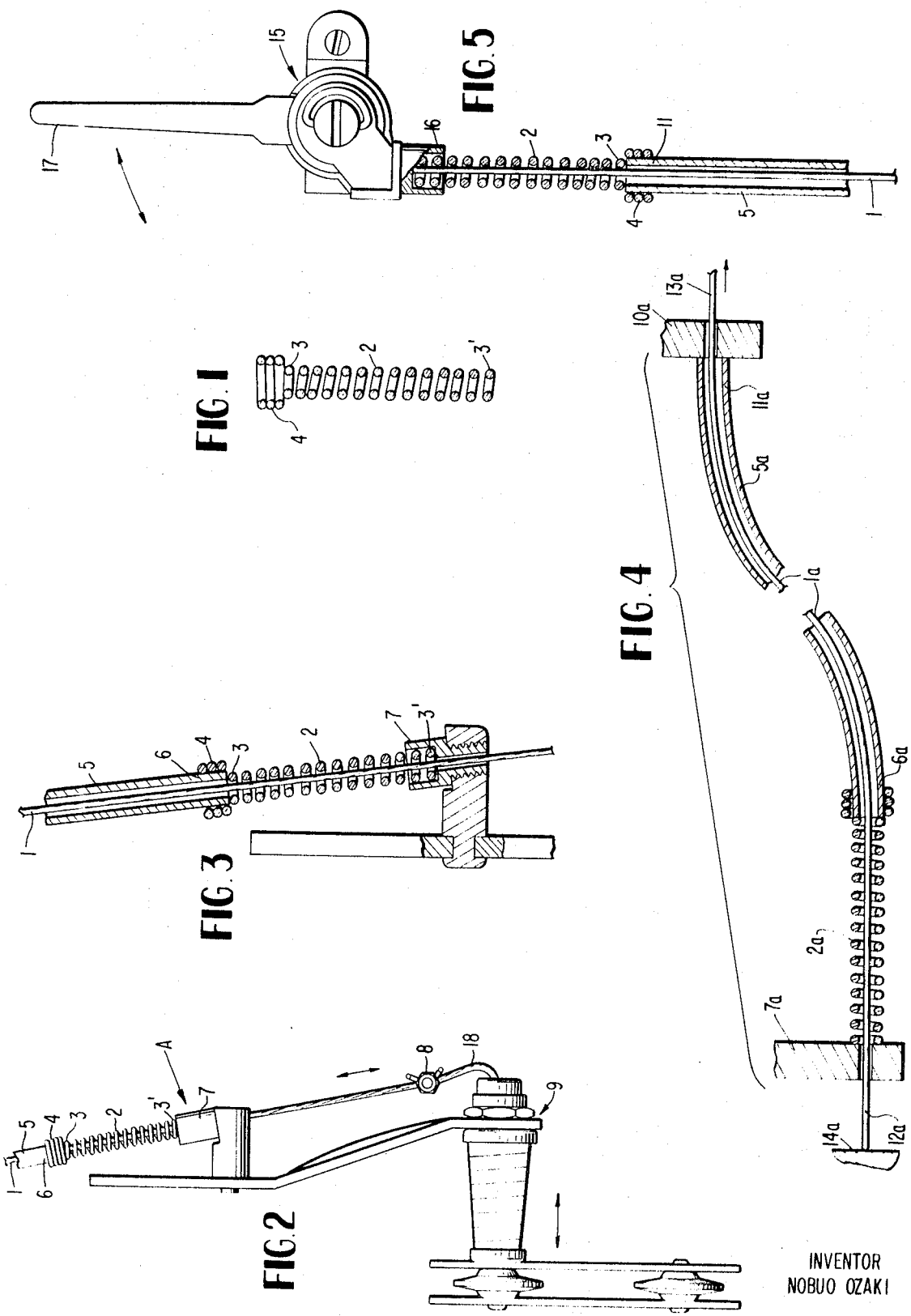
INVENTOR
NOBUO OZAKI
BY Browne, Schuyler & Beveridge
ATTORNEYS

SAFETY SPRING FOR THE SPEED CHANGE GEAR OF A BICYCLE

The present invention relates to a safety spring for the speed change gear of a bicycle and more particularly to a safety spring, for the speed change gear of a bicycle, which is inserted axially about a gearshift wire so that, when a careless operation of the control lever by a bicyclist causes the gearshift wire to undergo such excessive tension that it may warp the control lever or stretch the gearshift wire or bend the parts of the derailleur, the safety spring absorbs the tension.

It is an object of the present invention, therefore, to protect the speed change gear of a bicycle from the above-mentioned types of damage which will be caused by careless attempts, made by a bicyclist when his bicycle is either standing or freewheeling, to forcibly transfer the endless chain from one sprocket-pinion fixed to the rear hub of his bicycle to another sprocket-pinion.

It is an object of the present invention to provide a safety spring, for the speed change gear of a bicycle, which is inserted axially about a gearshift wire.

With the said objects in view which will become apparent from the following detailed description, the present invention will be more clearly understood in connection with the accompanying drawing, in which:

FIG. 1 is a sectional view of a safety spring designed according to the present invention;

FIG. 2 shows an example of the employment of the safety spring where the spring is applied on the side of the derailleur of a bicycle;

FIG. 3 is an enlarged sectional view of that part which is indicated by an arrow A in FIG. 2;

FIG. 4 illustrates an operation of the safety spring; and

FIG. 5 shows another example of the employment of the safety spring where the spring is provided on the side of the control lever for the speed change gear.

Referring now to the drawing, and more particularly to FIGS. 2 and 3, a safety spring in accordance with the present invention is inserted axially about a gearshift wire 1 which extends through a hole formed axially in a socket bolt 7 fixed to a derailleur 9 and which connects a chainlet 18, provided in the derailleur 9, with the lower end (15 in FIG. 5) of a control lever (17 in FIG. 5). The gearshift wire 1 and the chainlet 18 are connected with each other by means of a union nut 8.

The safety spring in accordance with the present invention is made of a coil spring 2, one end 3' of which is fitted into the hollow of the socket bolt 7 while the other end 3 is formed into a socket member 4.

About the wire 1 is further provided a sheath 5. In case of that example which is shown in FIG. 2, one end 6 of the sheath 5 is applied to the socket member 4 of the coil spring 2 while the other end (11 in FIG. 5) of the sheath 5 is applied to a socket (16 in FIG. 5) which is fixed to the bracket for the control lever 17.

If the control lever 17 is pivoted in the clockwise direction in FIG. 5, the gearshift wire 1 will be pulled toward the control lever 17 and the endless chain (not shown) will be switched over from one sprocket-pinion fixed to the rear hub of the bicycle to another sprocket-pinion, provided that the endless chain has been driven. In other words, the coil spring 2 does not work when a normal operation of the speed change gear is performed. However, if the control lever 17 is forcibly pivoted in the same direction as mentioned above while the bicycle is either standing or freewheeling, the coil spring 2 is compressed and absorbs the tension that might warp the control lever 17 or stretch the gearshift wire 1 or band the parts of the derailleur 9 if it were not for such a coil spring.

FIG. 4 illustrates how the coil spring 2 protects the speed change gear from the above-mentioned types of damage. A stationary part 7a is meant to correspond to the socket bolt 7 in FIG. 2 and a stationary part 10a to the socket 16 in FIG. 5. A gearshift wire 1a extends through the holes formed in the stationary parts 7a and 10a respectively and is curved between them. One end 12a of the gearshift wire 1a is fixed to a part of a derailleur 14a and the other end 13a of the gearshift wire 1a is meant to be fixed to the lower end portion of a control lever.

With conventional structures, switchover of the endless chain from one sprocket-pinion to another cannot be conducted when the bicycle is either standing or freewheeling. In other words, with conventional structures, the end 12a is unmovable when the bicycle is in either of the above-mentioned two states.

A coil spring 2a is inserted axially about the gearshift wire 1a between the stationary parts 7a and 10a. One end of the coil spring 2a abuts against the stationary part 7a while the other end of the coil spring 2a is formed into a socket member.

About the gearshift wire 1a, between the stationary parts 7a and 10a, is further provided a sheath 5a which is usually made of a material lacking elasticity and which is curved so as to hold the curved part of the wire 1a therein. One end 6a of the sheath 5a is applied to the socket member of the coil spring 2a while the other end 11a of the sheath 5a abuts against the stationary part 10a.

When the end 13a of the wire 1a is pulled in the direction indicated by an arrow in FIG. 4, the curved part of the wire 1a is forced to approach rectilinearity. If it were not for the coil spring 2a, viz., if the gearshift wire 1a were covered with the sheath 5a all through the interval between the stationary parts 7a and 10a, the curved part of the gearshift wire 1a would be hindered by the inelastic sheath 5a from approaching rectilinearity and would undergo tension in a greater or less degree. The tension would be greater if the end 12a were unmovable, i.e., if the bicycle were either standing or freewheeling.

In order to reduce this tension, part of the inelastic sheath 5a must be replaced by an elastic one, for which the coil spring 2a will serve.

In view of the fact that any part of the inelastic sheath 5a can be replaced by an elastic one, such an arrangement as is shown in FIG. 5 is also possible, in which the coil spring 2 is provided on the side of the control lever 17.

For the purpose of making still another arrangement, the sheath 5 can be cut in two so that the two sheaths sandwich the coil spring 2 in between. In case of this arrangement, the end 6 is fitted into the hollow of the socket bolt 7 and the end 11 is applied to the socket 16. Furthermore, it may be preferable in this arrangement that a socket member is formed at the end 3' of the coil spring 2 in addition to the socket member 4 formed at the other end 3.

While I have disclosed only a few embodiments of the present invention, it is to be understood that these embodiments have been given by way of examples only and not in a limiting sense, the scope of the present invention being determined by the objects and the claim.

I claim:

1. A safety device for use with a gear change mechanism of a bicycle or the like comprising:
   a curved gearshift wire,
   a substantially inelastic sheath disposed about said gearshift wire,
   at least one resiliently deformable means disposed about said gearshift wire and connected to said sheath to permit said wire to straighten if said wire is pulled when the associated gear change mechanism is locked.

2. A safety device as defined in claim 1 wherein said means is a coil spring.

3. A safety device as defined in claim 2 wherein said coil spring has at least one socket member formed at an end thereof and adapted to hold an end of said sheath.

4. A safety device as defined in claim 2 wherein said coil spring is adapted to be positioned adjacent to a control lever of an associated gear change mechanism.

5. A safety device as defined in claim 2 wherein said coil spring is adapted to be positioned adjacent to a derailleur of an associated gear change mechanism.

6. A safety device as defined in claim 2 wherein said sheath includes two sections and said coil spring is located about said wire between the two sheath sections.

7. In a gearshift mechanism for a bicycle or the like having a curved gearshift wire connecting a control lever to a derailleur, the combination of a substantially inelastic sheath disposed about said gearshift wire and at least one resiliently deformable means disposed about said gearshift wire and connected to said sheath to permit said wire to straighten if said wire is pulled when the associated gear change mechanism is locked.

8. In a gearshift mechanism for a bicycle or the like as defined in claim 7, the combination of a resiliently deformable means adjacent to said control lever, a resiliently deformable means adjacent to said derailleur, both disposed about said gearshift wire and connected to a substantially inflexible sheath disposed about said gearshift wire.